April 29, 1930.   C. M. RICHARDSON   1,756,438
METHOD OF AND APPARATUS FOR ASSEMBLING SHOE PARTS
Filed April 6, 1928   4 Sheets-Sheet 4
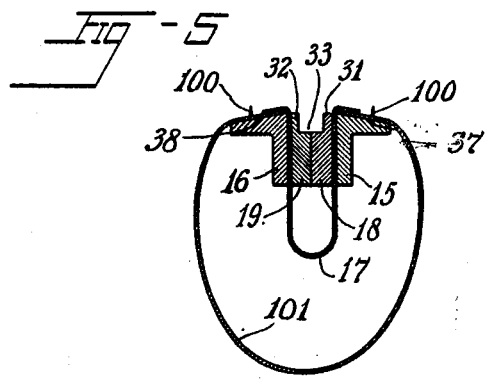
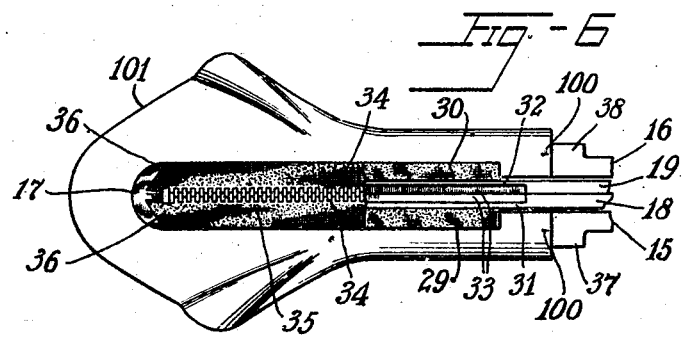
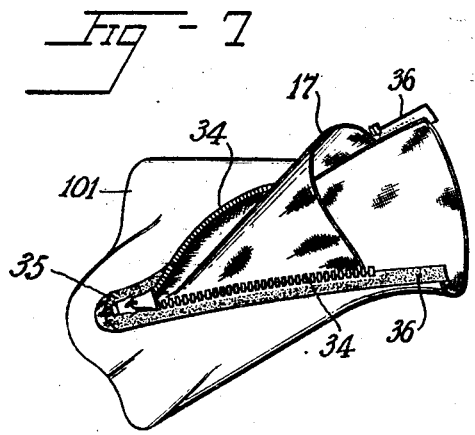
Inventor
Charles M. Richardson
By Pierson, Eakin & Avery
Attys Patented Apr. 29, 1930

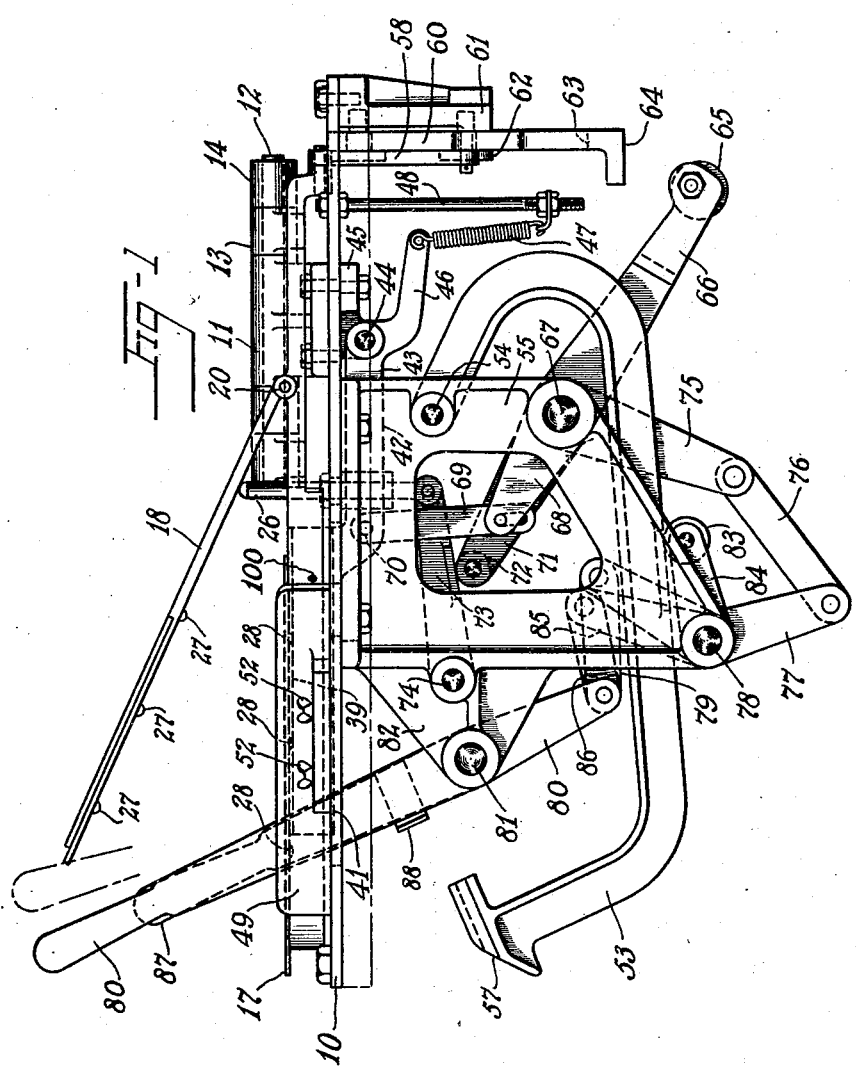

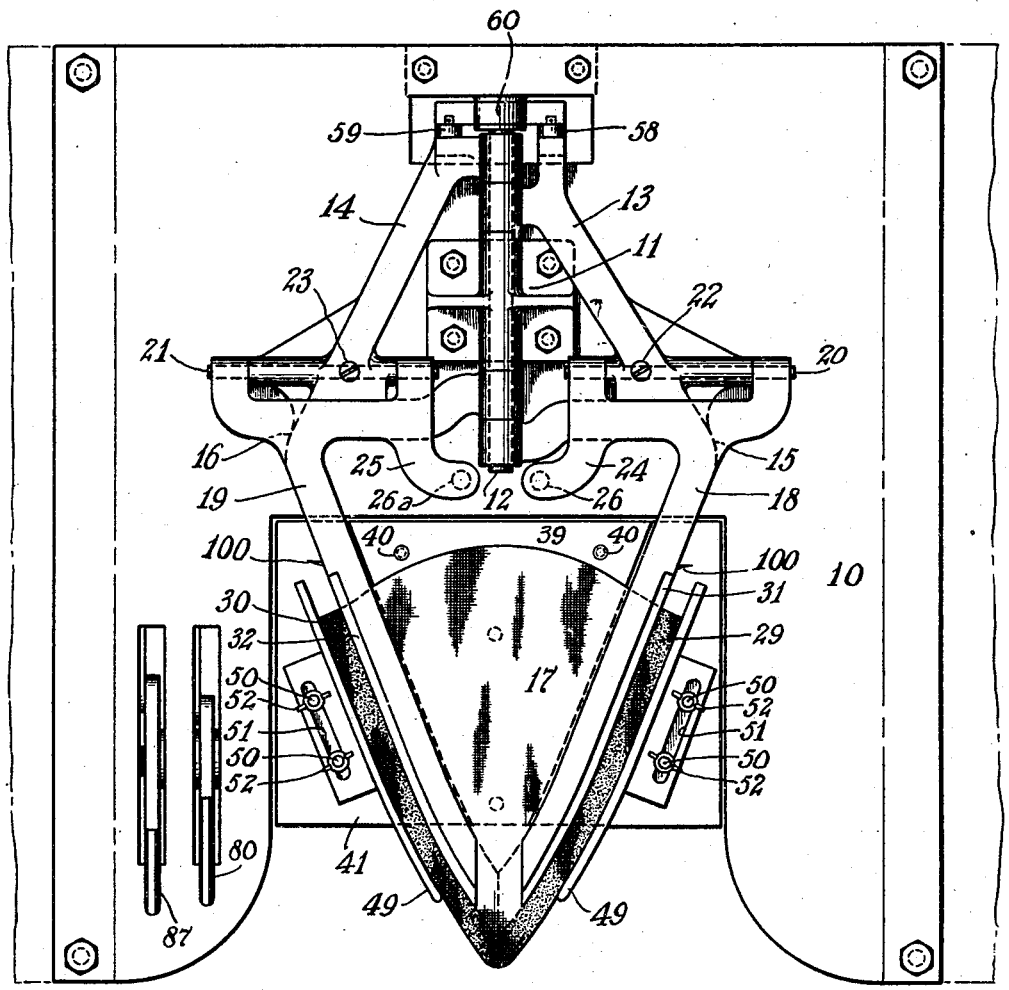

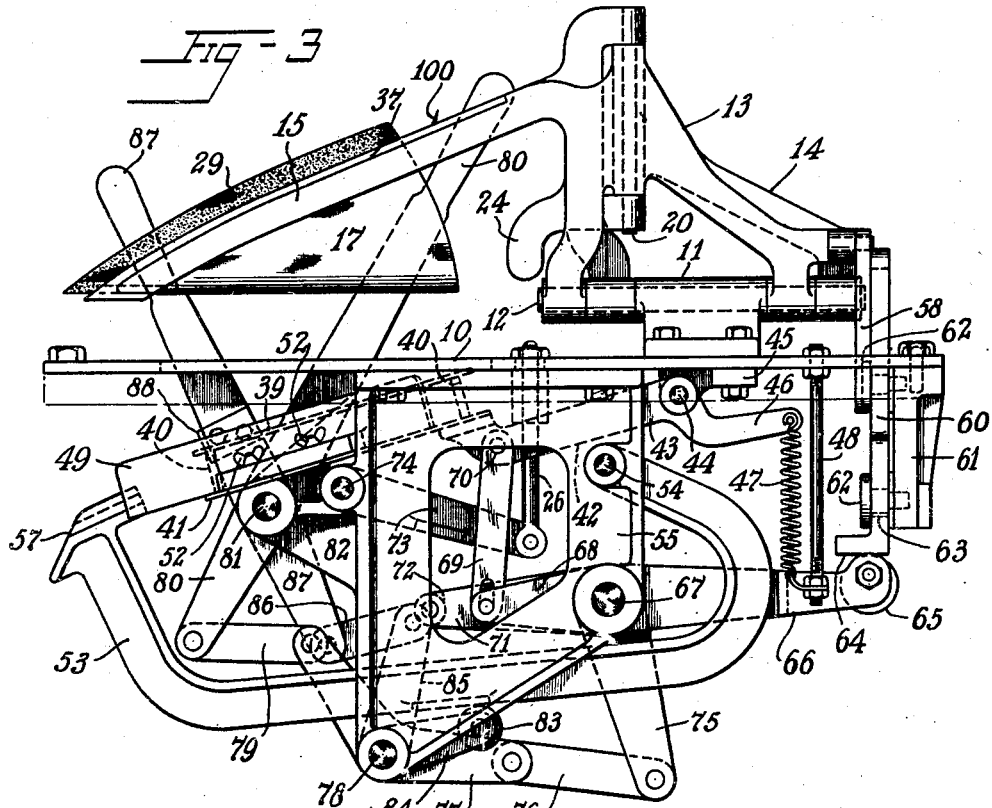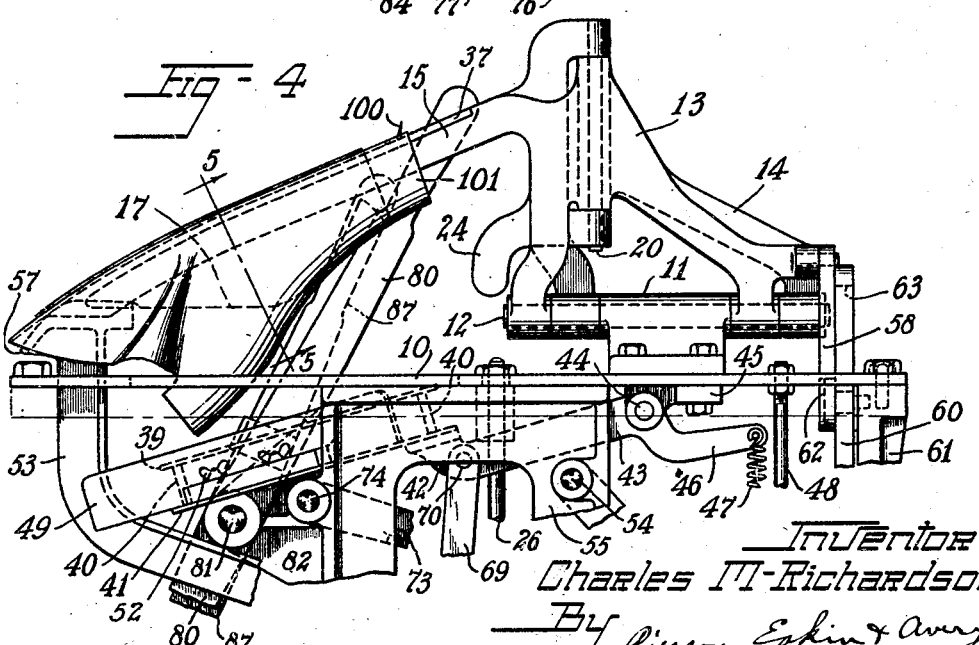

1,756,438

UNITED STATES PATENT OFFICE

CHARLES M. RICHARDSON, OF AKRON, OHIO, ASSIGNOR TO THE B. F. GOODRICH COMPANY, OF NEW YORK, N. Y., A CORPORATION OF NEW YORK

METHOD OF AND APPARATUS FOR ASSEMBLING SHOE PARTS

Application filed April 6, 1928. Serial No. 267,881.

This invention relates to methods and apparatus for assembling shoe parts, and especially the slide-fastener and adjacent parts of slide-fastener overshoes.

A machine heretofore has been designed for receiving the "pocket" or bellows-tongue member in spread condition and then moving its fastener-receiving margins into proximity to each other and supporting them in suitable spaced relation for the application of the slide-fastener thereto. In my improved method the lining of the overshoe is assembled with the pocket and the slide-fastener and my method is best performed by the aid of the said machine, preferably with the addition of certain members thereto.

My chief object is to provide for the rapid and accurate assembling in adhesive contact three or more sheets of material such as the lining, pocket and slide-fastener of an overshoe.

Of the accompanying drawings:

Fig. 1 is a side elevation of apparatus embodying and adapted to carry out my invention in its preferred form, with the parts in initial work-receiving position and with a part of the work therein.

Fig. 2 is a plan view of the same, at a later stage of operation.

Fig. 3 is a side elevation of the apparatus from the same viewpoint as that of Fig. 1 but showing a later stage of operation.

Fig. 4 is a view of the apparatus similar to that of Fig. 3 but showing a still later stage of operation.

Fig. 5 is a section on line 5—5 of Fig. 4.

Fig. 6 is a plan view of the finished work and parts of the apparatus supporting the same, a portion of the work being broken away.

Fig. 7 is a perspective view of the finished work.

Referring to the drawings, the device comprises a table 10 upon which is mounted a wide bearing-bracket 11 for a shaft 12 mounted in the bracket and extending in each direction therefrom. Hinged upon the end portions of the shaft 12 are a pair of swinging brackets 13, 14 each having bearing members mounted upon the shaft at each side of the bracket 11 and each formed with oblique extensions, 15, 16, which outwardly converge when the swinging brackets are in horizontal positions, as shown in Fig. 2, and which constitute gravity work-clamping members adapted to coact, to grip opposite side margins of a fabric blank 17, with a pair of work-clamping members 18, 19 which are hinged upon respective shafts 20, 21, secured by set screws 22, 23 (Fig. 2), in suitable mountings formed upon the respective swinging brackets 13, 14, the shafts 20 and 21 preferably being disposed in substantially perpendicular relation to the shaft 12 upon which the swinging brackets are mounted.

Each of the work-clamping members 18, 19 is formed with a short contact arm, 24 or 25, adapted to be engaged by a plunger, 26 or 26ª, slidably projecting upward through the table 10, for holding the members 18, 19 in elevated positions with relation to their hinge shafts 20, 21, as shown in Fig. 1, to permit the fabric blank 17 to be mounted upon the lower work-engaging members 15, 16, and for lowering the members 18, 19 onto the blank to hold the blank against the lower members 15, 16.

Each of the members 18, 19 is preferably provided on its work-engaging face with projections 27, 27 (Fig. 1) mating with dimples 28, 28 formed in the work-engaging faces of the members 15, 16, to prevent slippage of the blank.

The construction as described is such that the two work-clamping assemblies while clamping the margins of the blank 17 may be turned upward about the shaft 12 to bring into close relation the margins 29, 30 of the blank 17 projecting from the clamping members, as shown in Fig. 3.

The members 18, 19 are formed with rabbeted outer or upper edges, which provide thereon narrow, work-engaging flanges 31, 32 which define, when the clamping assemblies are brought together, as shown clearly in Figs. 5 and 6, a channel 33 adapted to accommodate the jaw members 34, 34 of a slide fastener assembly 35 while the stringer tapes 36, 36 of the slide-fastener are by hand presented to and adhesively pressed against the margins 29, 30 of the fabric blank, which are turned outward as shown in Fig. 5 for the reception of the slide-fastener assembly, the flanges 31, 32 thus serving as gauges for the accurate positioning of the slide-fastener assembly.

The work-clamping members 15, 16 are formed with respective work-pressing faces 37, 38 disposed at an angle to their work-clamping faces and adapted to serve as backing supports for the fabric margins 29, 30 in the pressing of the stringer tapes 36 against the latter.

For supporting the blank 17 in flatly spread condition when it is mounted upon the members 15, 16, a work-supporting plate 39 of generally triangular shape is positioned between the work-receiving positions of the members 15, 16, said plate being mounted upon posts 40, 40 rising from a plate 41 secured to and in extension of one arm 42 of a lever 43 which is fulcrumed upon a shaft 44 mounted in a bracket 45 secured to the under side of the table 10, the lever having a rearwardly extending arm 46 connected by a pull spring 47 with a post 48 projecting downward from the table, the spring 47 being adapted to urge the work-supporting plate 39 upward toward its work-supporting position, in which it is stopped by contact of the arm 42 with the lower face of the table 10.

For accurately positioning the blank 17, the plate 41 is provided with a pair of gauges 49, 49, which are adjustably secured upon the plate by stud bolts 50, 50 rising from the plate through slots 51, 51 formed in the base flanges of the respective gauges 49, the bolts being provided with wing nuts 52, 52.

In the particular operation for which the present embodiment of the invention is designed, the blank is of approximately triangular form, and it requires the attachment of the stringer tapes to its margins throughout zones extending almost to the apex of the triangle, and consequently the outer ends of the work-clamping members 15, 16 extend into close proximity to each other, and are substantially in alignment with the shaft 12 about which the work-clamping assemblies are turned. For supporting them against the pressure with which the slide-fastener assembly is adhesively secured to the margins of the blank, a cam lever 53 is fulcrumed upon a shaft 54 mounted in a pair of brackets such as the bracket 55, secured to the under side of the table 10 and the lever 53 is formed at its outer end with a cradle portion 57 adapted to engage the outer ends of the members 15, 16, and hold them against both downward and lateral displacement when the work-clamping assemblies are turned upward about the shaft 12 and the cam lever 53 is elevated.

For so turning the work-clamping assemblies, each of the swinging brackets 13, 14 is connected by a link, 58 or 59, with a slide 60, which is slidably held, against the face of a bracket 61 extending downward from the table, by a pair of cap screws 62, 62 mounted in a vertical slot 63 formed in the slide, and the slide 60 is provided at its lower end with a cam face 64 adapted to be engaged by a cam roller 65 journaled on the outer end of an arm 66 secured upon a shaft 67 which is mounted in the brackets 55.

Secured upon the shaft 67 is an arm 68 having lost motion connection with a link 69 pivoted at 70 to the arm 42 of the lever 43 for lowering the work-supporting plate 39 when the work-clamping assemblies are raised, and permitting the spring 47 to raise the work-supporting plate 39 when the work-clamping assemblies are lowered, the lost motion of the link 69 permitting the clamping members 18, 19 to descend onto the work before the work-supporting plate 39 is lowered, against the force of the spring 47, by the downward pull of the arm 68 upon the link.

Also secured upon the shaft 67 is an arm 71 provided on its outer end with a cam roller 72 adapted to coact with the lower face of an arm 73 hinged upon a shaft 74 mounted in the brackets 55, the arm 73 being hinged at its outer end to the plungers 26, 26ᵃ for holding the clamping members 18, 19 elevated, as in Fig. 1, while the members 15, 16 descend to work-receiving position, and to lower the members 18, 19 onto the work before the work-clamping assemblies are swung upward, lost motion being provided between the cam roller 65 and the cam face 64 of the slide 60, as shown in Fig. 1, to permit the members 18, 19 to engage the fabric blank before the slide 60 is moved upward.

For oscillating the shaft 67, an arm 75 is secured thereon and connected by a link 76 with one arm of a bell-crank lever 77, which is fulcrumed upon a shaft 78 mounted in the brackets 55, the other arm of the bell-crank lever 77 being connected by a link 79 with one arm of a hand lever 80 which is fulcrumed upon a stub shaft 81 secured in an extension 82 formed upon the rear bracket corresponding to the bracket 55. The parts are so proportioned that when the hand-lever 80 is in its forward position, as shown in Fig. 3, the arms 76 and 77 will act as a toggle, in over-center position, to hold the parts against return movement.

For raising the cam lever 53 with its cradle 57, a cam roller 83 is journaled on the end of an arm 84, which is secured upon the shaft 78, and an arm 85 secured upon the rear end of the shaft 78 is connected by a link 86 with one arm of a hand lever 87 which is fulcrumed upon the stub shaft 81, the parts being so proportioned that when the handle arm of the hand lever 87 is pushed forward to raise the cam lever 53 as shown in Fig. 4, the cam roller 83 will be in such an over-center position with relation to the lever 53 and the shaft 78 as to prevent reverse movement of the parts. To insure that the hand lever 87 will be returned to its original position before the hand lever 80, to withdraw the cradle 57 from the clamping members 15, 16 and permit the latter freely to turn, a bracket 88 secured to the hand lever 87 projects laterally past the hand lever 80, so that the latter cannot be moved backward so long as the hand lever 87 is held in its forward position by the contact of the lever 53 with the cam roller 83 in its over-center relation.

The structure so far described preceded my invention and, as to the apparatus, my invention comprises mounting a pin 100 upon each of the clamping members 15, 16 in position for anchoring thereon a shoe lining 101 to be assembled with the pocket 17 and the slide-fastener 35.

In the operation of the device, the parts being in the positions in which they are shown in Fig. 1, the blank 17 is laid upon the plate 39 and positioned between the gauges 49.

The hand lever 80 is then pushed forward, which causes the parts connected therewith as above described to move to the positions in which they are shown in Fig. 3, the plungers 26, 26ª being lowered to permit the members 18, 19 to descend onto and to grip the fabric blank before the work-supporting plate 39 is pulled downward and before the blank-clamping structures are swung upward. The arms 76, 77, acting as a toggle, then hold the connected parts in position as shown in Fig. 3. When the hand lever 80 is in its dotted line position of Fig. 1, in its forward movement, the parts of the machine are positioned as shown in Fig. 2. After the hand lever 80 has reached its foremost position, the parts then being positioned as in Fig. 3, the lining 101 is placed by hand in the position in which it is shown in Fig. 4 and is secured there by anchoring it upon the pins 100 and drawing it taut on the faces of the members 15, 16. The hand lever 87 is then moved forward, which causes the roller 83 to engage the lever 53, and thus to elevate the cradle 57 into engagement with the outer ends of the members 15, 16, as shown in Fig. 4, where it is held by the over-center relation of the roller 83.

The blank margins 29, 30, are thus presented as shown in Fig. 3, and they are then spread outwardly over the margins of the lining 101 and the slide-fastener assembly 35 is adhesively pressed upon them as shown in Fig. 6, the jaw members 34 of the slide-fastener assembly being accommodated in the channel 33 and positioned by the flanges 31, 32 for accurate assembly of the slide-fastener with the margins of the blank 17.

The assembling operation being thus completed, the hand levers 80 and 87 are returned to their original positions, which causes the other parts of the machine to be returned to their work-receiving positions of Fig. 1, the work being slipped from the clamping members 18, 19 as soon as the reverse movement of parts has cleared the cradle 57 from the members 15, 16 and has thus loosened the hold of the work-clamping members.

The dropping away of the work-supporting plate 39 before the work-clamping devices start their upward movement permits the middle portion of the fabric blank to be freely folded for bringing the margins of the blank into juxtaposition to each other.

The operation may be very rapid and it results in a very accurately assembled product having its parts strongly secured together.

Various modifications are possible within the scope of my invention as defined in the appended claims.

I claim:

1. The method of assembling a rubberized fabric shoe tongue blank with a fastener and a lining which comprises determinately positioning the blank in substantially flat form, determinately moving opposite margins of the blank to bring them into juxtaposition and parallel relation to each other and while it is so held placing the lining about the blank, securing the margins of the blank to the margins of the lining, and securing a fastener to the margins of the blank.

2. The method of assembling three pieces of sheet material which comprises determinately positioning one of the pieces in substantially flat form, determinately moving opposite margins of the piece to bring them into juxtaposition and parallel, spaced-apart relation to each other, and while it is so held placing a second piece of the material about the first piece in enveloping and margin-to-margin relation thereto, joining the margins of the first piece to the respective adjacent margins of the second piece, and joining margins of a third piece to the respective pairs of the margins so joined to connect the two pairs of margins.

3. Sheet-manipulating apparatus comprising means for supporting in determinate position and in substantially flat condition a piece of the sheet material, means for determinately moving opposite margins of the piece from such position into juxtaposition to each other and there constituting backing means for the margins with the margins lying substantially in the same pane, and means for locally anchoring another piece of sheet material upon the said backing means.

In witness whereof I have hereunto set my hand this 4th day of April, 1928.

CHARLES M. RICHARDSON.